United States Patent [19]

Hacskaylo et al.

[11] 4,266,873
[45] May 12, 1981

[54] COLLINEAR AIMING LIGHT IMAGE VIEWER

[75] Inventors: John J. Hacskaylo; Michael Hacskaylo, both of Falls Church, Va.

[73] Assignee: The United States of America as represented by the Secretary of the Army, Washington, D.C.

[21] Appl. No.: 68,270

[22] Filed: Aug. 20, 1979

[51] Int. Cl.³ ............................................. G02B 23/10
[52] U.S. Cl. ..................................... 356/251; 33/241; 250/333
[58] Field of Search ....................... 356/251, 153, 252; 250/333; 33/241, 242

[56] References Cited

U.S. PATENT DOCUMENTS

| 3,464,770 | 9/1969 | Schmidt | 356/252 X |
| 3,782,832 | 1/1974 | Hacskaylo | 356/153 |
| 3,974,585 | 8/1976 | Dunham | 33/241 X |
| 4,108,551 | 8/1978 | Weber | 250/333 X |
| 4,136,956 | 1/1979 | Ecchweber | 356/153 |

FOREIGN PATENT DOCUMENTS 609446  2/1979  Switzerland ................. 33/241

*Primary Examiner*—Conrad J. Clark
*Assistant Examiner*—Matthew W. Koren
*Attorney, Agent, or Firm*—Nathan Edelberg; Milton W. Lee; Max L. Harwell

[57] ABSTRACT

A collinear aiming light image viewer device in a common housing through which an observer may view both a target scene and a superimposed collinear aiming light beam within the viewer. The aiming light source is positioned in an offset area of the common housing to project a narrow IR beam off a partially reflective mirror along a portion of the optical axis of the image viewer onto a scene wherein the scene and IR beam images are simultaneously viewed through an image intensifier.

6 Claims, 7 Drawing Figures

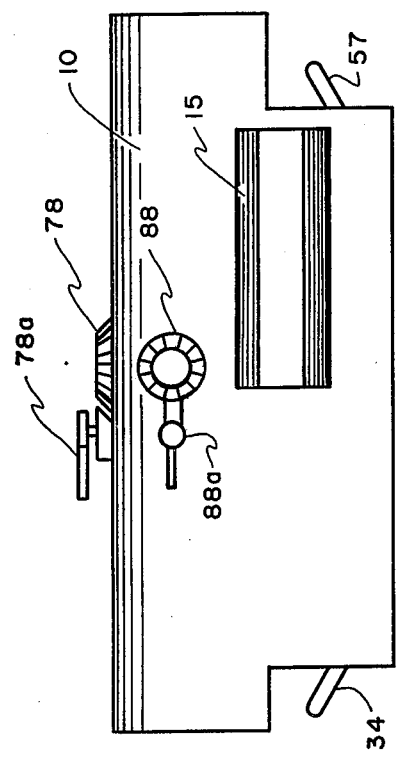
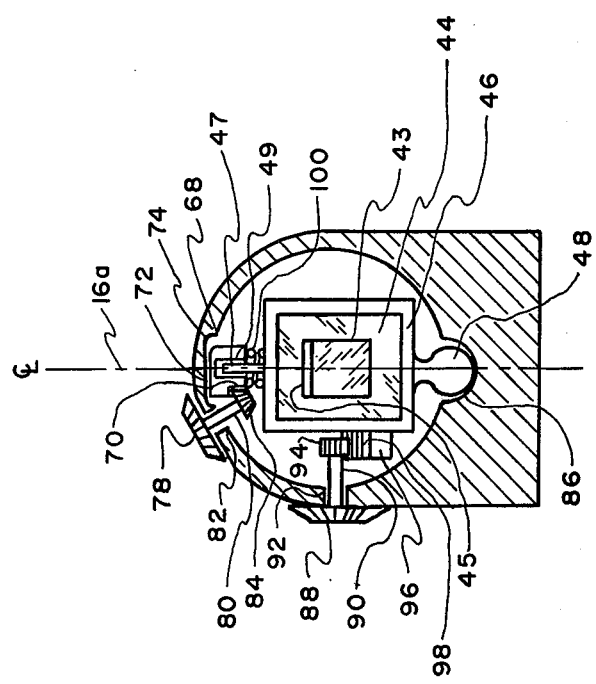

COLLINEAR AIMING LIGHT IMAGE VIEWER

The invention described herein may be manufactured, used, and licensed by the U.S. Government for governmental purposes without the payment of any royalties thereon.

CROSS-REFERENCE TO RELATED APPLICATION

This application is related to and is an improvement over U.S. Pat. No. 3,782,832 issued to Michael (NMI) Hacskaylo, one of the present inventors, and entitled, "Method of Boresight Alignment of a Weapon" and U.S. Pat. No. 3,867,764 issued to the same Michael (NMI) Hacskaylo and coinventor Howard L. Dunmire and entitled "Aiming Light and Aiming Light Adapter for Use on a Weapon."

BACKGROUND OF THE INVENTION

The present invention is generally related to a daytime/night-time sighting device for firing a bore-sighted weapon, but may be used with other devices such as surveying methods.

The old method of firing a bore-sighted weapon at night-time actually required two apparatuses, namely an infrared aiming light that is weapon mounted and night vision goggles that are head mounted on the soldier. Some of the disadvantages of the old method are as follows. Two apparatuses are required and the logistics of maintaining the two apparatuses for a single mission is undesirable. The night vision goggles are cumbersome to wear on the head and have proven to be rather costly. Also, the aiming light is useless unless the goggles are worn by that same individual.

SUMMARY OF THE INVENTION

The undesirable limitations and disadvantages of the prior art apparatuses used in the old methiod of firing a bore-sighted weapon are obviated by the present collinear aiming light image viewer device enclosed in a common housing, with the housing mounted on a weapon. Both the scene target image and the laser aiming light beam image are simultaneously viewed with the image viewer. A means for generating a laser aiming light beam comprised of a switchably battery controlled electronic pulser activating a/laser diode produce the aiming light beam which is however first projected out of the image viewer onto the scene of the target. The collinear aiming light image viewer may be attached to a weapon and be foresighted by the method explained in the above mentioned cross-referenced U.S. Pat. No. 3,782,832 for accurate and rapid firing of a shoulder-braced or hand-held weapon. The present image viewer improves the human factor aspects of a soldier in a tactical situation, proves cost effectiveness, and the logistics of maintaining the image viewer are reduced.

Novel features of the present collinear aiming light image viewer are as follow. The passive scene viewer, or image intensifier, and the active narrow beam light source are within the same common housing. Also, the optical axis along which the active narrow beam light source is projected out of the viewer onto a target scene is collinear with the optical axis of the image intensifier and is superimposed within the field-of-view of the image intensifier without detrimental visual obstructions. Both the image intensifier and the electronic pulser may be individually activated, or may be activated by one master switch.

The device will be better understood with reference to the following drawings.

BRIEF DESCRIPTION OF THE DRAWINGS

FIG. 2 is a sectional view of section 2—2 of FIG. 1;

FIG. 3 shows an external side view of FIG. 1;

DETAILED DESCRIPTION OF THE PREFERRED EMBODIMENT

Figure 1:
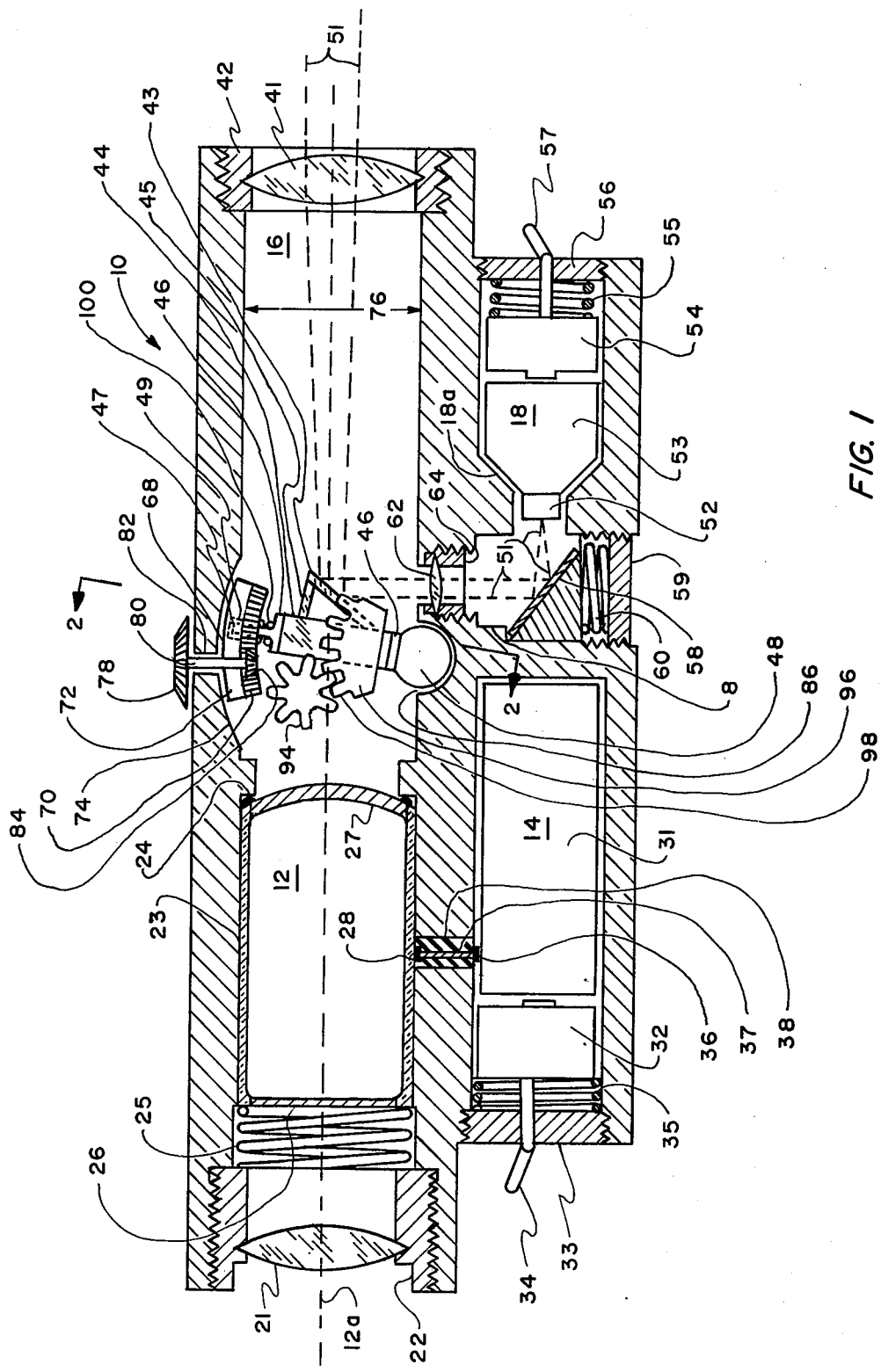
FIG. 1 illustrates a schematic internal cross-sectional view of the present collinear aiming light image viewer device.

Refer now to the schematic of the internal cross-section as shown in FIG. 1 for a more detailed explanation of the present collinear aiming light image viewer. The housing 10 may be fabricated from a solid metal, such as aluminum, magnesium-aluminum alloy, or any other readily machinable metal, that is comprised of four compartments. Housing 10 may be fabricated with appropriate engineering practices for tolerances, mechanical strength, shock resistance fittings, and external mounting means such as a weapons mount. The four internal compartments are comprised of an optics compartment 16, a laser diode compartment 18, an image intensifier compartment 12, and a high voltage compartment 14. The image intensifier has an optical axis 12A that extends through the entire device, i.e. also through the optics compartment 16. The high voltage compartment supplies the necessary high voltage for operation of an image intensifier in the image intensifier compartment. Optical means in the optics compartment is aligned with the optical axis 12A of the image intensifier and is further aligned with a laser aiming light beam emitted from a means for generating said laser aiming light beam within the laser diode compartment. The optics compartment 16 is comprised of an objective lens 41 held by the threadable objective lens holder 42. A laser aiming light beam 51 is projected out of housing 10 by way of lens 41. The position of the laser beam 51 is adjusted by the vertical and horizontal motion of a partially reflective mirror 43. The motion is imparted by elevational and azimuthal adjustment means that is described herein below. Reflective mirror 43 is held at a 45 degree position with respect a flat transparent optical element 44 by a transparent mirror support 45. The optical element 44 is held in a frame 46 that has a pivot pin 47 centered on top of the frame and a pivot ball 48 centered on the bottom of the frame. The pin 47 fits in a pivot pin opening 49 that is centered vertically in a curved cam 68. Cam 68 is comprised of gear teeth 70 on a sliding bar 72. The upper surface of the sliding bar 72 is curved to fit into a curved slot 74. Curved slot 74 and sliding bar 72 are dimensioned closely to allow for easy passage of the sliding bar 72 therethrough with very little frictional drag. The radius of curvature of the slot 74 is that of the inside diameter of the optics compartment, represented by numeral 76, plus nominally one half the housing thickness in the optics compartment 16.

The radius of curvature of the upper surface of the gear teeth 70 is no more than that of the inside diameter 76. The radius of curvature of the lower surface of cam 68 is approximately ⅛ of an inch less than the inside diameter 76 of the optics compartment 16. The point of rotation is in the center of the ball 48, which center further coincides with the level of an imaginary line projected along the bottom surface of the inside diameter of the optics compartment 16.

The above mentioned elevational and azimuthal adjustment means are comprised of elevational and azimuthal adjustment screws 78 and 88 respectively having internal stems with a gear on the end of each stem that meshes with gear teeth in cooperative arrangement with the flat transparent optical element 44. Specifically, the elevational adjustment screw 78 has a stem 80 passing through elevational screw stem aperture 82 in the top of the housing. The gear 84 at the end of the stem 80 is tapered to match the teeth 70 of the cam 68. The ball 48 fits in a spherical cavity 86 in the lower surface of the optical compartment 16. Thus, with all the units in position, the mirror 43 is rotated in the forward-backward direction around ball 48 by movement of the elevational adjustment screw 78. The flat transparent optical element 44 is restricted from sideways motion by the sliding bar 72 of the cam 68 that fits in the curved slot 74. When mirror 43 is set in the proper forward-backward direction by the elevational adjustment screw 78, a tapered elevational locking pin 78A (shown in FIG. 3) may be locked down on screw 78 to restrict any slippage thereof.

Look now at FIG. 2 along with FIG. 1 and note the center line 16A of the optics compartment 16. The azimuthal directional rotation of mirror 43 is provided by the rotation of the azimuthal adjustment screw 88 and its related stem 90 that fits through azimuthal screw stem aperture 92 and has a gear 94 that engages the azimuthal cam teeth 98 of azimuthal cam 96. Gear 94 meshes the azimuthal cam teeth 98. For good practice, the radius of curvature of the upper surface of the cam teeth 98 is ½ the inside diameter 76 of the optical compartment 16 and rotates about the center of ball 48. Thus, as the azimuthal adjustment screw 88 is rotated by an operator, the mirror is rotated about the ball-pivot pin axis, defined by an imaginary line between the center of ball 48 and the center of pin 47, regardless of the position of the mirror in the vertical direction as has been previously set by elevational adjustment screw 78 and locked in by the tapered elevational locking pin 78A. When azimuthal adjustment screw 88 is turned the desired amount, a tapered azimuthal locking pin 88A (shown in FIG. 3) may lock screw 88 to prevent slippage thereof. A compression spring 100, positioned between the frame 46 and sliding bar 72, keeps the sliding bar 72 firmly biased into the curved slot 74. Thus, the gear toothed curved elevational cam 68 is not directly attached to frame 46 but is biased from frame 46 against curve slot 74, but the gear toothed azimuthal cam 96 is rigidly attached to frame 46.

The image intensifier compartment 12 is comprised of the viewing lens 21 which is attached to the threadably removable retainer ring 22. The image intensifier unit 23 is held in position against a shoulder 24 of the housing 10 by the bias from an image intensifier compression spring 25 against retainer ring 22. The phosphor screen 26 renders the photocathode 27 action visible. The high potential contact 28 represents the high voltage input to 23, but may be representative of various voltages formed by a voltage divider as required. The shoulder 24 has a ground potential contact connected to the photocathode 27.

The high voltage compartment 14 is comprised of a high voltage d.c. converter 31 and a low voltage battery 32. A threadably removable high voltage compartment retainer ring 33, having a low voltage battery compression spring 35, holds the battery 32 and converter 31 in position. A high potential contact 36, connected to the output high voltage of the high voltage converter 31, and an electrical conductor 37 complete the electrical circuit to the image intensifier. The high voltage potential conductor 37 is electrically insulated from the housing by an insulator layer 38. A high voltage activation switch 34 switches the voltage from battery 32 to the d.c. converter 31 as needed.

The laser diode compartment 18 is comprised of a laser diode 52 that is pulsed by an electronic pulser 53 to emit a laser aiming light beam 51 therefrom. The battery 54 energizes the pulser 53 and is held in position by a compression spring 55 and retainer cap 56 biasing pulser 53 against beveled shoulder 18A. The activation switch 57 selectively activates the electronic pulser 53. A fully reflective mirror 58, which may be comprised of a layer of polished aluminum or silvered surface mounted on an appropriately contoured block of metal, deflects the laser beam by 90 degrees to impinge on the boresight partially reflective mirror 43. A threadably removeable reflective mirror retainer ring 59 and compression spring 60 hold the block of metal, such as nickel or some other non-corrosive material and upon which mirror 58 is mounted, in position against a raised shoulder stop 8. A laser beam focusing lens 62 is held in position by a threadably removeable focusing lens retainer ring 64.

FIG. 3 shows an external view of the collinear aiming light image viewer, further illustrating a mounting means 15 such as a weapons mount attachment bracket and the tapered elevational and azimuthal locking pins 78A and 88A respectively.

Figure 4:
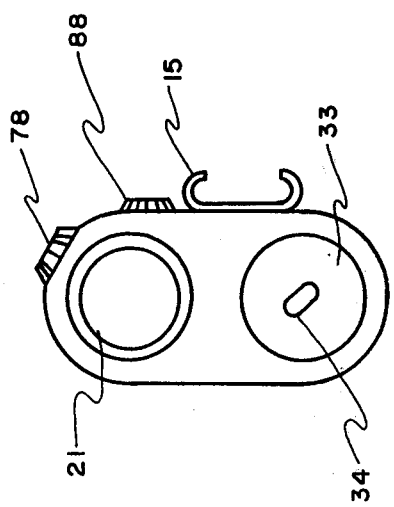
FIG. 4 shows an external end view of the present device.

FIG. 4 illustrates an end view of the viewer looking in at the operators end to show the relative size and positions of the high voltage and image intensifier compartments and the positions of screws 78 and 88 and bracket 15.

OPERATION OF THE DEVICE

Figure 5A:
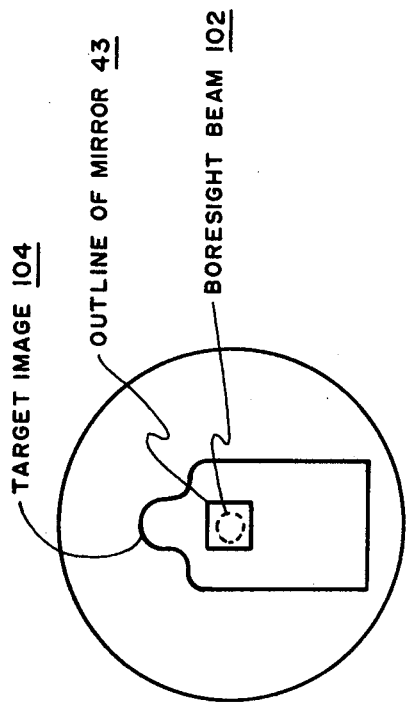
FIG. 5A illustrates a target silhouette image as viewed through the device.
Figure 5C:
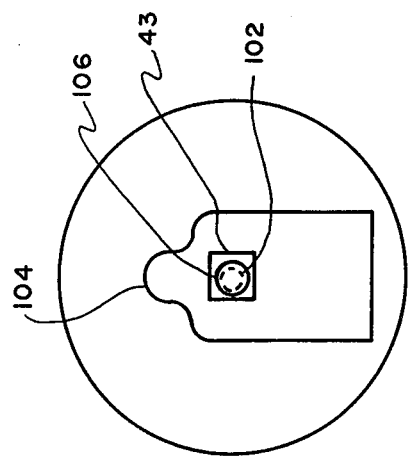
FIG. 5C shows the collinear aiming light image viewer in the boresighted condition.
Figure 5B:
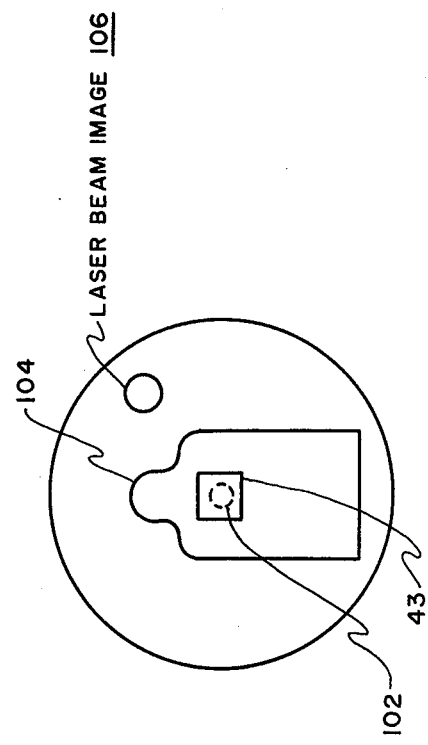
FIG. 5B illustrates the same image as in FIG. 5A with the addition of the laser beam aiming light image.

Refer now also to FIGS. 5A, 5B, and 5C for an explanation of the operation of the collinear aiming light image viewer device. When the device is mounted on a weapon by for example the bracket 15, the image intensifier 23 may be activated by the operator turning switch 34 "on" whereupon the operator may see a focused target image 104 with a giant outline of the boresight partially reflective mirror 43 as shown in FIG. 5A. The boresight beam 102 is shown here to represent a boresight light that may be used to initially align the laser aiming light beam with the boresight beam 102. A boresight light as taught in the above noted cross-referenced method of U.S. Pat. No. 3,782,832 may be used in the breech end of the weapon to produce the boresight beam 102. The laser aiming light beam 51 (shown in FIG. 1) is produced by activating switch 57. The image of the laser beam, represented in both FIGS. 5B and 5C as numeral 106, may for example first appear in the operator's field-of-view as shown in FIG. 5B. The return laser beam image 106 was first partially reflected by the boresight partially reflective mirror 43 out of the objective lens 41 toward the target. Both the target image and the laser beam image are returned back through the objective lens 41, the partially reflective mirror 43, and the flat transparent optical element 44 to impinge upon the photocathode 27 of the image intensifier 23. The photocathode 27 is at ground potential at shoulder 24 of compartment 12 and the screen 26 has the high voltage at contact 28 connected thereto. Objective lens 41 focuses these images on the photocathode. FIG. 5C shows a boresighted condition of the laser aiming light beam in the collinear aiming light image viewer device and also with the boresight of the weapon itself. The laser aiming light beam 51 is boresighted by the external elevational and azimuthal adjustment screws 78 and 88 respectively.

The laser diode 52 may be a gallium-aluminum arsenide laser of 0.006 inch width. Both of the batteries 32 and 54 may be silver-mercury batteries, or other batteries used by the military. The collinear aiming light image viewer device housing 10 is preferably 6" to 8" in length and a width of 1½" to 2" at the largest diameter. The laser aiming light beam focusing lens 62 is positioned in fixed focus with the objective lens 41. Lens 62 and 41, working in combination, narrow the laser aiming light beam 51 to about 4 milliradians as it passes out lens 41 toward the target area.

It is noted for prudent operation of the device in a hostile environment, the high voltage switch 34 may also function as a master switch for the laser pulser switch 57, and thus prevent actuation of the laser without the benefit of the viewer. The laser diode 52 may be checked for operational reactiveness and/or failure without auxillary equipment. It should be noted that specific spectral ranges, such as the visible or the far infrared regions, was not emphasized in the description of the invention. However, the principle and are described herein are adequate to cover any spectral range compatible with the generation and detection of light as well as other forms of electromagnetic radiations.

By appropriate modifications of the laser light source, electronic processor with information display, the collinear aiming light image viewer device may be readily adapted to perform the following functions. The device may be attached and used with large bore weapon. Other possible non-military uses of the collinear aiming light image viewer device are as a direct view designator, direct view rangefinder, direct view communicator, or as a direct view illuminator.

We claim:

1. A collinear aiming light image viewer device enclosed in a common housing, said device comprising:
   an image intensifier having an optical axis extending entirely through said common housing;
   a high voltage power supply section electrically connected to said image intensifier for providing high voltage bias thereto;
   a means for generating a laser aiming light beam out the target scene end of said collinear aiming light image viewer device; and
   an optics compartment having optical means therein for aligning said laser aiming light beam symmetrically along a portion of said optical axis that extends entirely through said common housing wherein returned reflections of said laser aiming light beam forming a laser beam image is directly viewed with a target image through said image intensifier.

2. A device as set forth in claim 1 wherein said optical means is comprised of a partially reflective mirror mounted on a flat transparent optical element in such a manner that said laser aiming light beam is reflected off said partially reflective mirror and out said target scene end and said laser beam image is returned back through said partially reflective mirror and said flat transparent optical element along said optical axis to impinge on the photocathode of said image intensifier for direct viewing through said image intensifier by an observer.

3. A device as set forth in claim 2 wherein said means for generating a laser aiming light beam is comprised of a switchably battery controlled electronic pulser having a laser diode that generates a laser aiming light beam therefrom when said switchably battery controlled electronic pulser is turned on wherein said laser aiming light beam is reflected off a fully reflected mirror mounted at 45° to said laser aiming light beam to divert said laser aiming light beam 90° directly through a focusing lens onto said partially reflective mirror at a generally 45° angle of incidence to project said laser aiming light beam along said optical axis out the target scene end of said collinear aiming light image viewer device.

4. A device as set forth in claim 3 wherein said optical means is further comprised of elevational and azimuthal adjustment means interacting with said partially reflective mirror and said flat transparent optical element to align said laser aiming light beam along said optical axis.

5. A device as set forth in claim 4 wherein said elevational and azimuthal adjustment means are comprised of elevational and azimuthal adjustment external screws having internal stems with a gear on the end of each of the stems that meshes with gear teeth in cooperative arrangement with said flat transparent optical element wherein said elevational adjustment screws rotates said flat transparent optical element in the vertical direction and said azimuthal adjustment screws rotates said flat transparent optical element in the horizontal direction to center said laser aiming light beam along said optical axis.

6. The device as set forth in claim 5 wherein said flat transparent optical element is enclosed in a mirror frame that has a multidirectional pivot ball centered on the bottom of said mirror frame in which said multidirectional pivot ball rests in a pivot ball cavity in the lower portion of said optics section and that has a pivot pin centered on the top of the frame which fits loosely into a pivot pin opening in a gear toothed curved elevational cam that is biased against a curved slot in the upper portion of said optics compartment by a mirror frame compression ring wherein the gear teeth on said curved cam mesh with the gear at the end of the stem of said elevational adjustment screw and said mirror frame further has a azimuthal cam with gear teeth thereon that is rigidly attached thereto wherein the gear teeth on said azimuthal cam mesh with the gear at the end of the stem of said azimuthal adjustment screw whereby operation of said elevational adjustment screw moves said curved elevational cam so that said pivot pin is carried along therewith to rotate said flat transparent optical element in the vertical direction and operation of said azimuthal adjustment screw moves said azimuthal cam so that said flat transparent optical element rotates in the horizontal direction with movement about said pivot pin and said multidirectional pivot ball wherein said laser aiming light beam is aligned with said optical axis.

* * * * *